United States Patent [19]

Abrams et al.

[11] 3,981,542

[45] Sept. 21, 1976

[54] ELECTRICAL BRAKE CONTROL SYSTEM

[75] Inventors: Max E. Abrams; Jess E. Wahlenmaier, both of Arkansas City, Kans.

[73] Assignee: Spring Machine, Inc., Arkansas City, Kans.

[22] Filed: Nov. 15, 1974

[21] Appl. No.: 524,056

[52] U.S. Cl. .............................. 303/20; 188/3 R; 303/7
[51] Int. Cl.² ........................................ B60T 13/74
[58] Field of Search ................ 188/3 R, 112; 303/3, 303/7, 15–17, 20

[56] References Cited
UNITED STATES PATENTS

| | | | |
|---|---|---|---|
| 3,350,142 | 10/1967 | Schuman | 303/20 X |
| 3,497,266 | 2/1970 | Umpleby | 303/20 X |
| 3,507,542 | 4/1970 | Cannella | 188/3 R X |
| 3,738,710 | 6/1973 | Pokrinchak et al. | 303/20 |
| 3,790,225 | 2/1974 | Wehde | 303/20 X |
| 3,836,205 | 9/1974 | Schwerin | 188/3 R X |

Primary Examiner—Stephen G. Kunin
Attorney, Agent, or Firm—Phillip A. Rein

[57] ABSTRACT

An electrical brake control system for a towed vehicle having an electric brake, where the control system is actuated by the hydraulic brake system in the towing vehicle. The electrical brake control system includes a hydraulic pressure transducer having a hydraulic input connected to the hydraulic brake system of the towing vehicle and an electrical output proportional to the hydraulic pressure developed by the hydraulic system. A comparator circuit has first and second inputs and an output. A circuit connects the first input to the electrical output of the hydraulic pressure transducer and a second circuit connects the output from the comparator circuit to the electrically operated brake in the towed vehicle. A feedback system connects the electrically operated brake to the second input of the comparator circuit such that the comparator circuit always maintains the feedback voltage to the second input substantially identical with the voltage of the first input.

7 Claims, 3 Drawing Figures

ELECTRICAL BRAKE CONTROL SYSTEM

BRIEF DESCRIPTION OF THE PRIOR ART

Several types of hydraulically operated electrical output type braking systems are in use at the present time. One system is actuated by the electrical brake light indicator on the braking system of the towing vehicle. When the pedal is depressed the brake light is actuated which sends a signal to an integrating circuit. The integrating circuit applies a continually increasing voltage to the electrical solenoids in the brakes of the towed vehicle. In this device, the longer the brake pedal is depressed the more brake power is applied to the brakes of the towed vehicle. This type brake system tends to cause the brakes of the towed vehicle to eventually lock.

The second type of braking system uses a potentiometer-type circuit. Thus, as the brakes are depressed, the potentiometer is pushed from a minimum value to a maximum value. This type braking circuit tends to cause the power to be applied to the brakes in steps rather than a smooth transition from a point of no braking to a point of maximum braking. The system further does not provide for the need of pressing the brake electromagnet against the brake drum initially using a large current and then diminishing the current to match the amount of hydraulic pressure actually necessary to maintain the brake in a proper braking mode.

BRIEF DESCRIPTION OF THE INVENTION

This invention discloses an electrical circuit which has a transducer connected to the hydraulic braking circuit of the towing vehicle. As force is applied to the brake pedal of the towing vehicle, the hydraulic pressure is increased in the braking system of the towing vehicle. This increase in hydraulic pressure is transmitted to the transducer which causes an electrical output to develop from the transducer by an amount proportional to the pressure being applied in the hydraulic system. The electrical output from the transducer is applied to a comparator circuit which has an output which is subsequently amplified and applied to the electric brake of the towed vehicle. A feedback signal is taken from the signal eventually transmitted to the brake and applied to a second input of the comparator circuit. The comparator circuit then operates to maintain the feedback voltage as near the applied transducer voltage as possible. Since the applied transducer voltage is a measure of the hydraulic pressure actually being applied to the braking system of the towing vehicle, the feedback voltage would then be indicative of the voltage actually being applied to the brakes of the towed vehicle. Since the two will be matched, the towed vehicle will be braked by an amount substantially proportional to the braking amount of the towing vehicle. The circuit also includes an impulse generating circuit connected from the signal output of the circuit being applied to the brakes and to the transducer input of the comparator circuit. Thus when a signal is transmitted from the transducer to this input the impulse circuit will generate a large signal voltage which is applied initially to the electric brakes. The signal will then taper off permitting the feedback circuit to control the power being applied to the electric brakes thereby maintaining the towed vehicle brake power proportional to the pressure being applied to the hydraulic braking system of the towing vehicle. Other features and advantages of this invention can be observed by referring to the Figures and the following specifications.

OBJECTIVE OF THE INVENTION

An electrical brake control system for a towed vehicle having electrically operated brakes, wherein the control system is actuated by the hydraulic brake system of the towing vehicle in such manner as to cause braking of the towed vehicle proportional to the braking of the towing vehicle. The electrical brake control system includes a hydraulic pressure transducer having a hydraulic input connected to the hydraulic brake system of the towing vehicle and an electrical output proportional to the input hydraulic pressure. Means are provided in the remainder of the electric brake control system to cause the braking force of the electrically operated brakes in the towed vehicle to be substantially proportional to the electrical output of the hydraulic pressure transducer. Means are also provided in the electrical brake control system for adjustment of the proportionality constant to allow for differing towed vehicle load conditions and differing electric brake configurations.

DETAILED DESCRIPTION OF THE INVENTION

Figure 1:
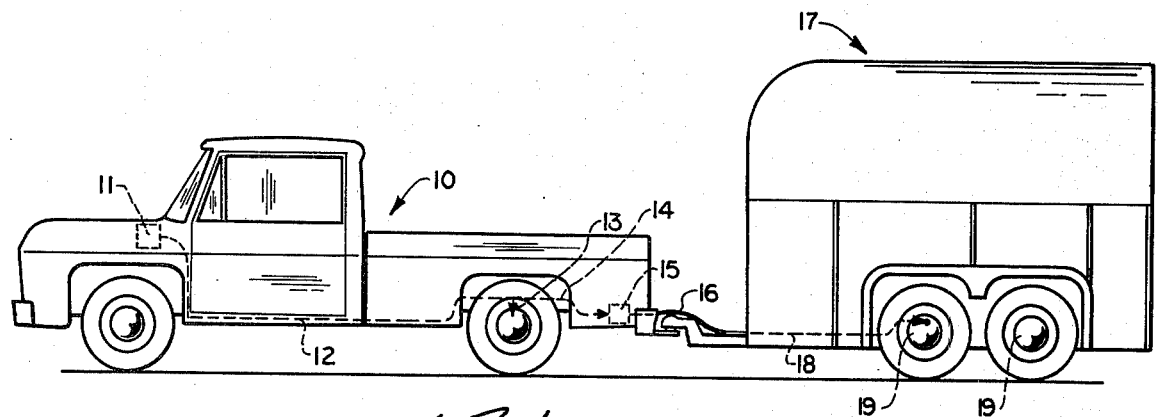
FIG. 1 is a side view of a truck and a trailer showing the hydraulic circuit in the dotted lines in the truck and the electrical circuit in the dotted lines in the trailer.

Referring to FIG. 1, a truck generally referred to by the number 10 has a hydraulic braking system 11 with hydraulic lines 12 traversing the length of the truck and to the rear of the truck for connection to a rear axle braking system 13. An extension of the hydraulic system through a hydraulic line 14 extends back to an electrical brake control circuit 15. From the output of the electrical brake control circuit 15 is coupled an electrical wire 16 which passes through the towed vehicle generally referred to by 17, through a wire 18 and to an electrical brake unit or brakes 19 in trailer 17. Brakes 19 are well known in the art and need not be further explained except to state that each of the brakes normally contains a pair of brake shoes which are spring-biased away from a brake drum. An electrical solenoid when powered, forces the brake shoe against the brake drum in the usual manner.

Figure 2:
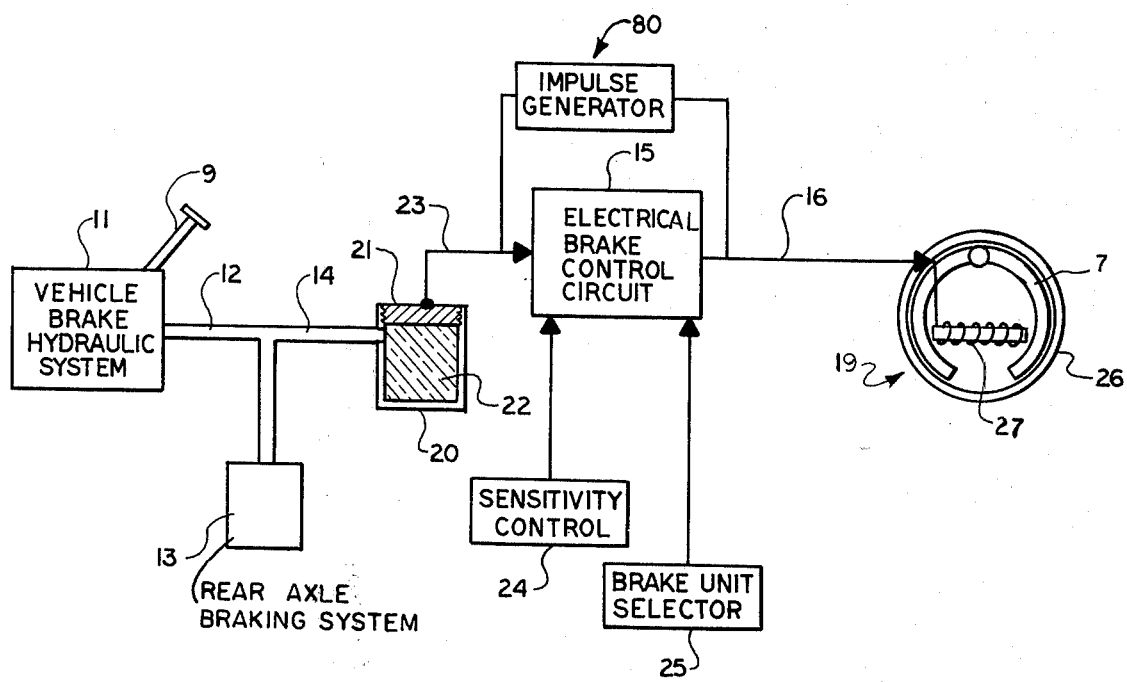
FIG. 2 is a block schematic of the vehicle braking system, transducer, electrical brake control circuit, and the electrical brake unit in the towed vehicle.

Referring to FIG. 2, a block diagram from the usual circuit is shown where the vehicle hydraulic braking system 11 as previous mentioned is coupled through a pipe 12 and pipe 14 to a hydraulic reservoir 20 which has a transducer 21 mounted therein and in fluid contact with hydraulic brake fluid 22 contained therein. Transducer 21 will be explained in more detail in references made to FIG. 3. From transducer 21 is an electrical connection 23 to electrical brake control circuit 15. Electrical brake control circuit 15 also contains a sensitivity control 24 and a brake unit selector 25. In the broad operation of this system illustrated in FIG. 2 when the hydraulic brakes are depressed by a pedal 9, vehicle hydraulic braking system 11 causes a pressure increase inside pipes 12 and 14 causing brake fluid 22 to increase in pressure in reservoir 20. The increase of pressure in hydraulic fluid 22 causees transducer 21 to generate an electrical output through wire 23 to electrical brake control circuit 15 which will then generate an output through wire 16 to a solenoid 27 causing brake shoes 7 to move against brake drums 26 braking the towed vehicle. Brake unit selector circuit 25 which will be later described, adapts the electrical brake control circuit 15 to various numbers of electrical brake units 19. For example, some trailers may contain two electrical brake units 19 for a pair of wheels, four for 2 pair of wheels, etc. An impulse generator 80 connects from wire 16 to wire 23 which is an input to electrical brake control circuit 15.

Figure 3:
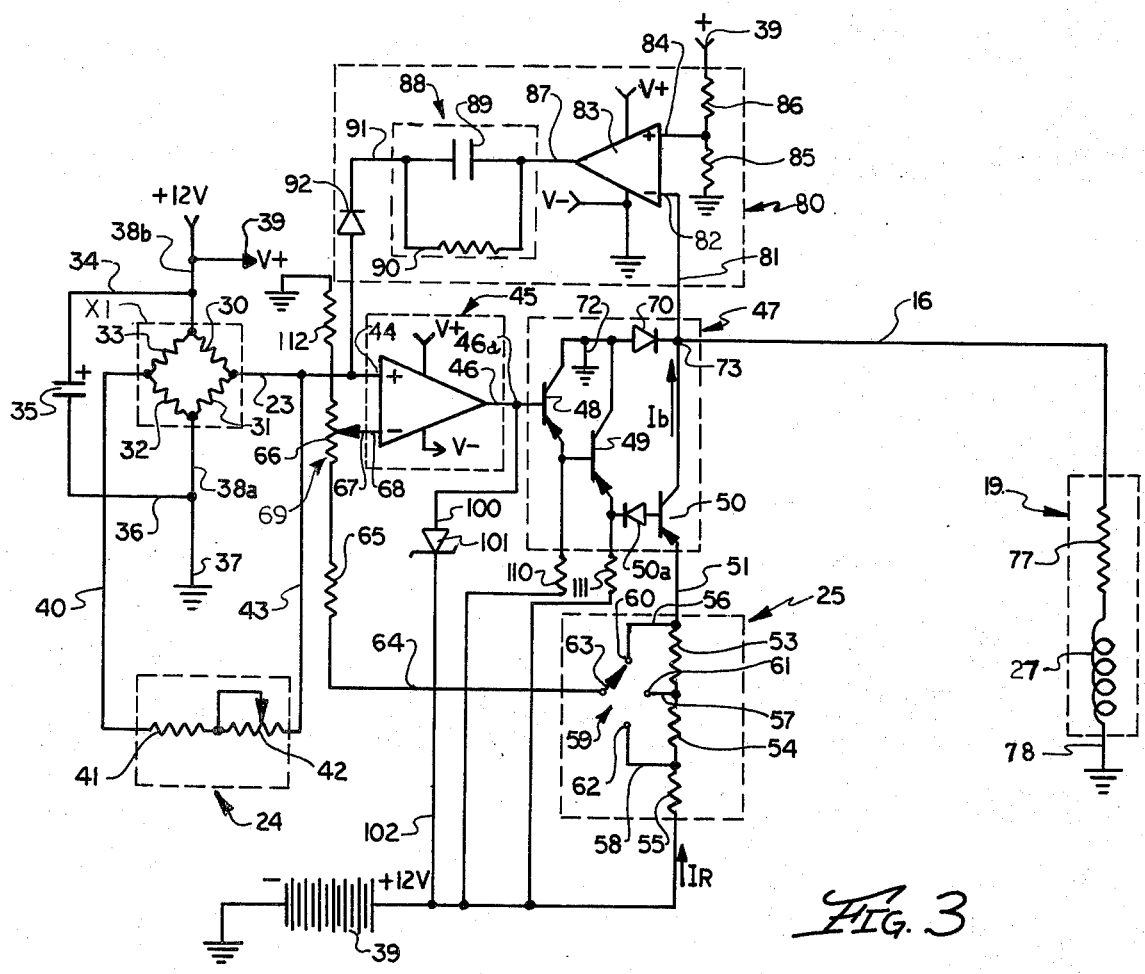
FIG. 3 is an electrical schematic of the electrical brake control circuit.

Referring to FIG. 3, a detailed electrical brake control circuit is illustrated. A transducer X1 is a wheatstone bridge type strain gauge of the monolythic silicon construction having approximately 1,800 ohms nominal resistance per arm. Bridge X1 comprises four arms 30, 31, 32 and 33. The junction between arms 30 and 33 is connected through a wire 34 to a filter capacitor 35. Wire 36 is connected through the remaining side of filter capacitor 35 to ground 37. The junction between arms 32 and 31 is likewise connected to a wire 38a to ground 37. Junction between arms 30 and 33 is connected through a wire 38b to a source of voltage 39. The junction between arms 33 and 32 is connected through a wire 40 to a fixed resistor 41 and variable resistor 42, and through a wire 43 to the junction between arms 30 and 31, which, in turn, is also connected to a first input terminal 44 of a comparator circuit generally referred to by arrow 45. The output of comparator circuit 45 is coupled through a wire 46 and a terminal 46a to an amplifier circuit means 47. The variable voltage, indicated as V1, at terminal 46a is the output from comparator circuit 45.

Amplifier circuit means 47 comprises a pair of amplifiers or transistors 48 and 49 connected in the usual manner to a source of voltage and a source of bias. A diode 50a connects the output emitter of transistor 49 to the base of final output amplifier transistor 50. The emitter of output amplifier transistor 50 is connected through a wire 51 to a brake unit selector circuit generally referred to by arrow 25 and comprises resistors 53, 54, and 55 which are connected respectively to wires 56, 57, 58 and to a selector switch 59 at terminals or taps 60, 61, and 62 respectively.

A selector arm 63 is connected through a wire 64, a resistor 65, and a resistor 112 to a potentiometer 69. The potentiometer 69 includes a resistor 66 and a variable arm 67 of which is coupled to the second input terminal 68 of comparator circuit 45. A diode 70 is connected between the collector of transistor 49 and the collector of transistor 50. The collectors of transistors 48 and 49 are coupled through a wire 72 to ground. Junction 73 is connecterd through a wire 16 to the remote electrical brake units in the towed vehicle generally referred to by the number 19. The brake contains the solenoid 27. Resistance 77 represents the D.C. resistance of the solenoid 27. Solenoid 27 is then coupled through a wire 78 to ground.

The impulse generator generally referred to by the number 80 has its input connected at junction 73 through a wire 81 to the second input 82 of a switching transistor circuit referred to by number 83. A first input 84 is coupled to a voltage dividing circuit comprising resistors 85 and 86 coupled between ground and a source of voltage 39. The output of switching transistor circuit 83 is coupled through a wire 87 to a differentiating circuit generally referred to by arrow 88 which comprises a capacitor 89 and a resistor 90 connected in parallel. Wire 91 is connected through a diode 92 to the first input terminal 44 of comparator circuit 45. The output of comparator circuit 45 through wire 46 is also coupled through a wire 100 to a zener diode 101 and through a wire 102 to a source of voltage 39. Resistors 110 and 111 furnish bias for the transistors 48 and 49 respectively.

OPERATION

The hydraulic pressure on transducer X1 controls a linerally proportional current $I_b$ through the external brake circuit comprising wire 16, solenoid 27 through wire 78 to ground. It does so in the following manner: The voltage output of transducer X1 is applied to the positive or first input node of comparator circuit 45. The bias network for comparator circuit 45 consists of resistors 66, 65, and 112 and a selected portion of a resistor network which comprises resistors 53, 54, and 55 which are selectively inserted into the circuit by means of selector switch 59 and terminals 60, 61, or 62 respectively.

The selector switch 59 comprises a means for adjusting the total feed back voltage generated by current $I_b$ as it flows through the battery 39, wire 51 through transistor 50 to junction 73 through wire 16 and brake units 19 through wire 78 to ground. The voltage thus generated across one or more of the resistors 55 through 53 is applied to resistors 65, 66, and 112 to the negative input terminal 68 of comparator circuit 45. Adjustable potentiometer 69 is varied by moving variable arm 67 until the proper bias voltage is applied to the negative input terminal 68. For proper setting, no brake pressure is applied, and bridge X1 presents a steady voltage of about 6 volts to positive input terminal 44 of comparator circuit 45. Potentiometer variable arm 67 is then adjusted until the voltage at negative input terminal 68 is slightly less or closer to ground than input terminal 44. This setting forces the output voltage at terminal 46a to approach the positive supply voltage 39 and therefore shuts off the amplifier circuit means 47 consisting of transistors 48, 49, and 50. Diode 50a is an additional P.N. junction diode, and inserted in the amplifier to insure that comparator circuit 45 can completely shut off transistor 50 under the maximum tolerance condition of comparator circuit 45.

As pressure on X1 increases the voltage output of X1 decreases in potential. When the voltage output of X1 becomes closer to ground potential than the voltage at the input of the negative input terminal 68 of comparator circuit 45, V1 lowers toward ground potential thus turning on the amplifier transistors 48, 49, and 50. As amplifier transistor 50 is turned on the current IR through resistor string 53, 54, and 55 (IR is proportional to $I_b$) causes a voltage drop to develop across these aforementioned resistors. This voltge drop causes the bias voltage at the minus terminal 68 of comparator circuit 45 to decrease by an amount approximately one-half that of the voltage drop developed across resistors 53 and 55. Because of the extremely high gain of the transistor amplifiers comprising transistors 48, 49, and 50, V1 will continue to lower toward ground potential, $I_b$ will continue to increase and the voltage drop across the resistor series will continue to increase until the bias voltage at the negative input terminal 68 to comparator circuit 45 is again as close or closer to ground potential than the voltage at the positive input terminal 44 of comparator circuit 45. The feedback relationship is stable because $d(e-)/dt$ ($e-$ is the voltage at X1 output terminal 23) and $d(er)/dt$ ($er$ is the voltage drop across resistor string 53 through 55) are always the same sign and appear on input nodes of comparator circuit 45 whose effects on the output voltage V1 are 180° out of phase, and also because comparator circuit 45 is internally phase compensated over a wider frequency range than the response of transistor 50.

The electro-mechanical properties of the electric brake units 19 prevent actuation of braking effect until an indeterminate and variable threshold voltage between approximately 2-½ and 3-½ volt is reached. When this threshold is exceeded, sudden actuation of one or more electric brake units occurs. If the brake electromagnet voltage is allowed to remain applied to the brakes, brake grab or lock up can (and usually does) occur under conditions of light trailer loading. It has been determined experimentally, however, that once brake actuation is achieved, braking action is essentially proportional to brake voltage over a brake voltage range of from 0.5 volts to 12 volts.

Circuitry consisting primarily of switching transistor circuit 83, capacitor 89, and resistors 85 and 86 prevent grab and allow proportional braking control by adding an impulse voltage to the input terminal 44 of comparator circuit 45 in the following manner: With no pressure on X1 brake voltage VB at junction 73 is zero (ground potential) and the voltage at negative input terminal 82 of switching transistor circuit 83 is zero. The voltage on the positive input terminal 84 of the switching transistor circuit 83 is a positive voltage of approximately 0.8 of a volt which is determined by the bias network comprising resistors 85 and 86. Under the above conditions, the voltage at wire 87 is forced to approach the positive supply voltage 39 which backbiases diode 92 and allows capacitor 89 to discharge through resistor 90. When brake voltage VB exceeds the bias voltage on the positive input terminal 84 of amplifier or switching transistor circuit 83 the high gain of amplifier 83 forces the voltage at wire 87 to approach ground potential. Capacitor 89 at this instant begins to charge through diode 92 which presents a low impedance path from the positive input terminal 44 of comparator circuit 45 to virtual ground. This condition forces V1 towards ground potential, limited only by the zener voltage of diode 101. Diode 101 prevents Veb (max) of transistor 48 from being exceeded and the base-emitter junction from being destroyed. The feedback voltage from selector switch 59 is insufficient to bring the positive and negative input terminals 44 and 68 respectively to equal potential so the transistors 48, 49, and 50 saturate putting maximum brake voltage on electrical brake unit 19. The amplifier string consisting of transistors 48, 49, and 50 will remain saturated until capacitor 89 has charged sufficiently to allow the voltage at the anode of diode 92 to come within the control range of the feedback system at terminal or input 68 of comparator circuit 45. From that time the brake voltage will decrease exponentially to a value just in excess of the switching transistor circuit 83 switching threshold value set by resistors 86 and 85. The hysteresis effect is caused by the small additional current sunk to ground from the positive input terminal 44 of the comparator circuit 45 through diode 92, resistor 90 and the output of amplifier 83. The circuit is also inherently stable in spite of the 90° phase shift introduced by the differentiation in capacitor 89 because diode 92 in effect removes amplifier 83 and capacitor 89 from the comparator circuit 45 feedback loop when diode 92 is back biased.

BRAKE UNIT SELECTOR CIRCUIT

Brake unit selector circuit 25 which is previously mentioned consists of resistors 54, 53, and 55 along with selector switch 59. These resistances are adjusted so that the feedback voltage being applied to terminal 68 through the feedback network including resistors 65, 66, and 112 will be appropriate to control the number of electric brake units actually being connected in parallel with wire 16. If a two-solenoid or dual electric brake unit is used, for example, selector switch 59 will be connected to terminal 60. If a four-solenoid unit is required, selector switch 59 will be connected to terminal 61; and if a six-solenoid unit, for example, is needed selector switch 59 will be connected to terminal 62 so that the voltage being fed back will be proportional to the current being demanded for each of the units connected in parallel with electric brake unit 19. Selector switch 59 must be a shorting type to prevent introduction of undesired transients during switching due to momentary loss of bias voltage to the negative input terminal 68 of comparator circuit 45. Resistor 41 and adjustable resistor 42 provides a shunting effect to the output voltage of transducer X1 thereby permitting the transducer to be adaptable to various braking systems and various conditions under which vehicles are being towed. Filter capacitor 35 provides filtering for the input voltage thereby removing as much electrical noise from the transducer supply voltage as possible. The above is necessary because of the narrow output voltage range of the transducer X1.

In an embodiment of this invention which was actually constructed operational comparator circuit 45 and switching transistor circuit 83 are a dual I.C. operational amplifier type 5558. Diode 92 is a 1N914 silicon diode, diodes 50a and 70 are 1N4001 silicon rectifiers, filter capacitor 35 is a 100 microfarad. Capacitor 89 is a 2 microfarad. Transistor 48 is a 2N2907. The transistor 49 is a T.I.P. 32 P.N.P. silicon transistor, and transistor 50 is a 2N6329 P.N.P. silicon transistor (both transistors 49 and 50 are manufactured by Texas Instruments, Inc.). Resistor 41 is 680 ohms; resistor 42 is 10 K ohms; resistors 65 and 112 are 1.70 ohms; resistor 66 is 100 ohms 10-turn-trimmer. Resistor 90 is a 2.4 meg ohm; resistor 110 is a 1.0 ohm; and resistor 111 is a 100 ohm; resistor 53 is a 4.7 milli ohm; resistor 54 is a 1.39 milli ohm; resistor 55 is a 2.78 milli ohm; resistor 86 is a 6.8 K ohm and resistor 85 is 430 ohms. Diode 101 is a 4.7 volt zener diode.

CONCLUSIONS

A circuit has been illustrated which provides proportional electrical brake control of the towed vehicle which relates to the pressure being applied to the hydraulic braking system of the towing vehicle. The circuit also provides for a momentary application of instantaneous voltage to the braking system of the towed vehicle so that the brake magnets will rapidly move against the brake drums. The instantaneous voltage is soon removed permitting the system to return to the proportional control mode. This system also provides means for adapting the circuit to various numbers of electric braking units employed, and for adjustment depending on the load and type of the vehicle being towed.

While the preferred embodiment has been declared using a hydraulic braking system, it is obvious that any fluid would actuate the transducer, whether it is compressible or incompressible. For example, air as used in air brakes would operate the tranducer in a manner similar to the hydraulic fluid. This invention is intended to cover either type fluid. While the transducer was illustrated as being connected by an extension 14, it is obvious that it can be mounted at any location in the pressure circuit including directly on the master cylinder.

It is obvious that various changes and modifications can be made in the invention described in the specifications and claims, and still be within the spirit and scope of this invention.

What we claim is:

1. In a braking system having a fluid circuit and an electrically operated braking system having one or more braking units, an electrical control circuit comprising:
   a. a fluid pressure transducer means having a fluid input connected to said fluid circuit means, and producing an electrical output signal proportional to the fluid pressure of said fluid circuit;
   b. comparator circuit means having 1st and 2nd inputs and an output;
   c. circuit means for connecting said 1st input to said electrical signal output of said fluid pressure transducer means;
   d. circuit means connecting said output from said comparator circuit means to said electrically operated brake;
   e. feedback means connecting said electrically operated brake to said 2nd input; whereby said comparator circuit means maintains the feedback voltage to said 2nd input substantially identical with the voltage at said 1st input by controlling the magnitude of its output to said electrically operated brake; and
   f. an impulse generating circuit means having its input connected to the input of said electrically operated brake and its output connected to said 1st input, whereby an impulse will be generated upon initial operation of the brakes forcing the brake magnets against the brake drums.

2. An electrical control circuit as described in claim 1 having a variable resistance shunt connected across the electrical output of said fluid pressure transducer means.

3. An electrical control circuit as described in claim 1 wherein said feedback means includes a selective voltage dividing means for selectively compensating the electrical control circuit to different numbers of individual electrical braking units.

4. An electrical control system for a vehicle having a fluid system for controlling its brakes and a towed vehicle having an electrical activator for operating its braking system, said electrical braking control system comprising:
   a. a transducer having a fluid input adapted to be connected to the fluid braking system of said vehicle and a transducing means responsive to a variation in the pressure of said fluid braking system, and developing an electrical output signal proportional to said fluid pressure variation;
   b. a comparator amplifier means having 1st and 2nd inputs and an output and wherein said 1st input is connected to said transducer electrical output;
   c. amplifier means having an output, and an input connected to the output of said comparator amplifier means;
   d. means for connecting a source of power through said amplifier means output to said electrical activator;
   e. feedback means connected between said amplifier means output and said 2nd input; and
   f. an impulse voltage generating means connected between the output of said amplifier means and the 1st input.

5. An electrical braking control system as described in claim 4 wherein said impulse voltage generation means comprising a switching amplifier having 1st and 2nd inputs and an output means for connecting said 2nd input to the output of the amplifying means and said 1st input connected to a source of bias voltage slightly higher than the minimum voltage on said 2nd input, differentiating means and diode means serially connected between the output of said switching amplifier and the 1st input of said comparator amplifier means.

6. An electrical control system as described in claim 4 wherein said feedback means includes a selective voltage dividing means in series with said means for connecting a source of power with said amplifier means output to said electrical activator.

7. An electrical control system as described in claim 4 including an adjustable shunt across said electrical output of said fluid pressure transducer.

* * * * *